United States Patent
Qian et al.

(10) Patent No.: US 10,228,022 B2
(45) Date of Patent: Mar. 12, 2019

(54) MANUFACTURING METHOD OF PRECISION MACHINE TOOL BEARING WITH HIGH PRECISION STABILITY

(71) Applicant: WUHAN UNIVERSITY OF TECHNOLOGY, Wuhan, Hubei (CN)

(72) Inventors: Dongsheng Qian, Hubei (CN); Lin Hua, Hubei (CN); Huajie Mao, Hubei (CN); Qinglong Liu, Hubei (CN); Jiadong Deng, Hubei (CN)

(73) Assignee: WUHAN UNIVERSITY OF TECHNOLOGY, Wuhan, Hubei (CN)

( * ) Notice: Subject to any disclaimer, the term of this patent is extended or adjusted under 35 U.S.C. 154(b) by 189 days.

(21) Appl. No.: 15/370,239

(22) Filed: Dec. 6, 2016

(65) Prior Publication Data

US 2018/0051751 A1 Feb. 22, 2018

(30) Foreign Application Priority Data

Aug. 22, 2016 (CN) .................. 2016 1 0699768.1

(51) Int. Cl.
*C21D 1/30* (2006.01)
*C21D 6/04* (2006.01)
(Continued)

(52) U.S. Cl.
CPC .............. *F16C 33/64* (2013.01); *B21B 37/46* (2013.01); *C21D 1/04* (2013.01); *C21D 1/18* (2013.01);
(Continued)

(58) Field of Classification Search
None
See application file for complete search history.

(56) References Cited

U.S. PATENT DOCUMENTS

| | | | | |
|---|---|---|---|---|
| 3,712,808 A | * | 1/1973 | Phillip | ............... C22C 38/42 116/34 A |
| 3,891,477 A | * | 6/1975 | Lance | ............... C21D 6/04 148/578 |
| 5,174,122 A | * | 12/1992 | Levine | ............... C21D 1/62 62/457.9 |

FOREIGN PATENT DOCUMENTS

| | | |
|---|---|---|
| CN | 103316926 A | 9/2013 |
| CN | 103924060 A | 7/2014 |
| CN | 104694730 A | 6/2015 |

OTHER PUBLICATIONS

English abstract of CN 102221495 A, Chen X., et al., Oct. 19, 2011.*

(Continued)

*Primary Examiner* — Deborah Yee
(74) *Attorney, Agent, or Firm* — Tim Tingkang Xia, Esq.; Locke Lord LLP

(57) ABSTRACT

A manufacturing method of precision machine tool bearing with high precision stability includes the procedures: (1) microstructural stabilization of bearing body: by cold ring rolling, two liquid quenching, ultrasonic assisted multiple cryo-tempering treatment and stress ageing treatment, the bearing body with high microstructure stability can be obtained; (2) precision machining; (3) internal stress relaxation of bearing body: after precision machining, by executing magnetic treatment on the bearing body, bearing ring with high microstructure stability and low internal stresses can be obtained; and (4) bearing assembly: finally precision machine tool bearing with high precision stability can be obtained. Considering that the critical factors affecting the precision stability of bearing is the degree of microstructure stability and internal stresses, by improving the microstructure stability and reducing residual stress in multistage (Continued)

manufacture phase, precision stability of precision machine tool bearing should be promoted.

3 Claims, 2 Drawing Sheets

(51) Int. Cl.
| | |
|---|---|
| C21D 9/40 | (2006.01) |
| C21D 8/00 | (2006.01) |
| C21D 1/613 | (2006.01) |
| C21D 1/50 | (2006.01) |
| C21D 1/18 | (2006.01) |
| C21D 1/04 | (2006.01) |
| F16C 33/64 | (2006.01) |
| B21B 37/46 | (2006.01) |
| C21D 1/58 | (2006.01) |
| C21D 7/02 | (2006.01) |
| B21B 5/00 | (2006.01) |
| B21B 9/00 | (2006.01) |

(52) U.S. Cl.
CPC ............... *C21D 1/30* (2013.01); *C21D 1/58* (2013.01); *C21D 1/613* (2013.01); *C21D 6/04* (2013.01); *C21D 7/02* (2013.01); *C21D 8/005* (2013.01); *C21D 9/40* (2013.01); *B21B 5/00* (2013.01); *B21B 9/00* (2013.01); *F16C 2202/06* (2013.01); *F16C 2220/44* (2013.01); *F16C 2223/10* (2013.01); *F16C 2322/39* (2013.01)

(56) References Cited

OTHER PUBLICATIONS

English abstract of CN 103555923 A, Liu, H. et al., Feb. 5, 2014.*

* cited by examiner

MANUFACTURING METHOD OF PRECISION MACHINE TOOL BEARING WITH HIGH PRECISION STABILITY

CROSS-REFERENCE TO RELATED APPLICATION

This application claims priority to and benefit of Chinese Patent Application No. 201610699768.1, filed Aug. 22, 2016 in the State Intellectual Property Office of P.R. China, which is hereby incorporated herein in its entirety by reference.

FIELD OF THE INVENTION

This invention relates generally to the field of machinery manufacturing, and more particularly to a manufacturing method of precision machine tool bearing with high precision stability.

BACKGROUND OF THE INVENTION

As the foundation of high-end manufacturing, the stability of precision machining tools is closely related to the precision stability of precision machine tool bearings. Machine tool bearing made of high carbon chromium bearing steel such as GCr15 contains considerable metastable microstructures (retained austenite and tempered martensite) and a high level of internal stress after conventional heat treatment processes. Tiny dimensional changes of bearing body resulted from metastable microstructure transformation and internal stress release under the effect of temperature and stress during rotations would damage the precision stability of bearing, weaken the precision and affect the machining stability of precision machining tools.

For the reasons given above, the precision stability of bearing has become a tough problem that restricts the application and development of precision machine tools.

SUMMARY OF THE INVENTION

One of the objectives of the invention is to provide a manufacturing method of precision machine tool bearing with high precision stability. Noticing that metastable microstructure state and internal stress are the key factors that damages the precision stability of bearing. By co-processing of microstructure stabilization and internal stress reduction, the stability of microstructure of bearing body is enhanced and internal stress level is reduced, thereby the precision stability of bearing is improved ultimately.

Aiming at the above-mentioned objectives, in one aspect, this invention is to provide a manufacturing method of precision machine tool bearing with high precision stability, which includes the following procedures:

(1) Microstructural stabilization of bearing body.

Cold ring rolling with technical control: The forming method of cold ring rolling should be adopted. (It is an existing technology, for example, Chinese patent No. CN103316926A discloses a cold rolling forming method for automotive hub bearing ring part with L-shaped cross section). Firstly, according to the bearing ring size and rolling ratio, the ring blank size can be designed. Then the conventional hot forging method is used to manufacture the ring blank. Afterwards, based on the bearing ring size, the ring blank size and the cold ring rolling condition, the shape and size of the roller can be designed and manufactured. Finally, using the rolling cavity and cold ring rolling mill, the bearing ring can be manufactured. During the cold ring rolling process, the rolling speed should be controlled as three stages: high feed speed, middle feed speed and low feed speed. The feed amount should be controlled in the range 20%-40% and the feed speed should be controlled in the range 0.5 mm/s-1 mm/s.

1) Two liquid quench: The bearing body is heated up to 820-840° C. in a protective atmosphere (such as nitrogen or argon) and held for 30-60 min. The quenched bearing body is obtained by oil quenched at 60-70° C. for 3-5 min, and then immersed in liquid nitrogen freezer at −190° C. for 4-10 min;

2) Ultrasonic assisted multiple cryo-tempering treatment: A further cryogenic treatment is executed to the quenched bearing body in aforementioned liquid nitrogen freezer at temperature ranged from −120 to −196° C. for 3-5 hours. During the low temperature holding, the liquid nitrogen is vibrated by ultrasonic under vortex flow pressure of 2.5-3.5 MPa for 20-40 min. After cryogenic treatment, a low-temperature tempering is implemented to bearing body at 160-180° C. for 1-2 hours. Circulate the above cryogenic treatment and low temperature tempering for 2-3 times;

3) Stress ageing treatment: After ultrasonic assisted multiple cryo-tempering treatment, stress ageing treatment is applied using a temperature and stress coupling loaded bearing body aging device (It is an existing technology, for instance, Chinese patent No. CN103316926A discloses a temperature and stress coupling loaded bearing body aging method and corresponding device); Firstly, assemble the bearing body on the arc-shaped pressing block in the stress loading device. Axial load on the bearing body is exerted by rotating the small bevel gear. Then the stress loading device is put into the heating furnace with controlled temperature, and the aging temperature and the time is set. Microstructure stabilized bearing body can be obtained by implementing stress ageing treatment with loading force ranged from 60-150N and aging temperature ranged from 80-150° C. for 3-6 hours and other previous treatment;

(2) Precision machining: Precision machining is executed to the microstructure stabilized bearing body.

(3) Internal stress relaxation of bearing body: Chinese patent No. CN201410145023.1 discloses a magnetic treatment method for controlling residual stress of bearing body after machining. It includes the following steps:

Firstly, the bearing body is fixed using the magnetic treatment device fixture; and then low frequency alternating magnetic field is generated by energizing the magnetizer composed of field coil windings and iron core in magnetic treatment device with AC excitation current produced by variable-frequency power source. The precision machined bearing body is magnetic treated in magnetic field with saturation magnetization ranged from 1.2-2.5 T and magnetic field frequency ranged from 1.5-4 Hz for 90-120 s to obtain bearing body with high microstructure stability and low internal stresses.

(4) Bearing assembly: By assembling the bearing body fulfilled the above methods with other bearing components, finally precision machine tool bearing with high precision stability can be obtained.

Chinese patent No. CN103316926A discloses a cold rolling forming method for automotive hub bearing ring part with L-shaped cross section. It includes the following steps:

(1) Design and processing of ring blank.

The ring blank shape should be designed to L-shaped cross section with a conical surface and a step on the inner surface. The size of ring blank should be designed as follows:

a) Calculating the volume ratio.

The L-shaped cross section ring blank can be divided into two parts by the step surface. The upper part has a bigger inner hole and the lower part has a smaller one. D, $d_b$ and $d_s$ are respectively the outer radius of the ring blank, the inner radius of the smaller hole and the inner radius of the bigger hole. B and $B_s$ are respectively the height of the ring blank and the height of the step. L is the length of the step. V and $V_s$ are respectively the volume of the ring blank and the volume of the smaller hole ring. $k_s$ is the volume ratio of the smaller hole ring to the whole ring. The following sizes can be calculated by $$L = (d_b - d_s)/2,$$
$$V = \frac{\pi}{4}[(D^2 - d_s^2)B_s + (D^2 - d_b^2)(B - B_s)],$$
$$V_s = \frac{\pi}{4}(D^2 - d_s^2)B_s,$$
$$k_s = V_s/V;$$

b) Selecting the rolling ratio.

The rolling ratio $\lambda$ is defined as the inner diameter ratio of the smaller hole in the target ring $d_s$ to the smaller hole in the ring blank $d_{s0}$. That is to say $\lambda = d_s/d_{s0}$. The value of $\lambda$ can be selected from 1.1 to 2.

c) Determining the ring blank size.

Firstly, based on the selected rolling ratio $\lambda$, the inner diameter of the smaller hole in the ring blank can be determined by $d_{s0} = D_s/\lambda$.

The height of the ring blank $B_0$ can be calculated by $B_0 = B - \Delta B$, where $\Delta B$ is the absolute value of the lower deviation of the ring height.

The step height of the ring blank $B_{s0}$ can be equaled to the step height of the target ring $B_s$. That is to say $B_{s0} = B_s$. Then the height of the bigger hole in the ring blank can be calculated by $B_{b0} = B_0 - B_{s0}$.

The step length of the ring blank $L_0$ can be equaled to the step length of the target ring L. That is to say $L_0 = L$.

The volume of the ring blank $V_0$ can be calculated by $V_0 = K_V V$,
where $K_v$ is the volume compensation coefficient, generally the value is 1-1.03.

The volume ratio of the partial ring with smaller hole to the whole ring $k_s'$ can be calculated by $k_s' = \psi k_s$,
where $\psi$ is the adjusting coefficient, generally the value is 1-1.05.

According to the volume of the partial ring blank with smaller hole, the outer diameter of the ring blank $D_0$ can be calculated by $$D_0 = \sqrt{\frac{4k_s'V_0}{\pi B_{s0}} + d_{s0}^2}$$

According to the volume of the partial ring blank with bigger hole, the inclination angle of inner surface of the bigger hole in the ring blank $\theta_0$ can be calculated by $$\theta_0 = \arctan\left\{\frac{-3(d_{s0} + 2L_0)B_{b0} + \sqrt{9(d_{s0} + 2L_0)^2 B_{b0}^2 - 12B_{b0}\frac{4V_0(1 - k_s') - \pi[D_0^2 - (d_{s0} + 2L_0)^2]B_{b0}}{\pi}}}{4B_{b0}^2}\right\}$$

Then the inner diameter of the bigger hole in the ring blank $d_{b0}$ can be calculated by $$d_{b0} = d_{s0} + 2L_0 + 2(B_0 - B_{s0})\tan\theta_0$$

According to the designed volume and size, the ring blank used to cold ring rolling is manufactured by cutting the bar, heating, upsetting and punching.

(2) Design of rollers.

The closed cavity is adopted to restrict the axial spread during cold ring rolling, which is benefit to form a high quality ring with flat upper and lower surfaces. The rolling cavity is composed of the working surfaces of main roll and mandrel. The shape of the roller cavity should be designed according to the ring shape. The working surface of the main roll is cylindrical surface. The working surface of the mandrel is composed of two different diameter cylindrical surfaces. The size of the main roll and mandrel is designed as follows:

a) Size of the roller cavity.

Based on the ring height B, the step height $B_s$ and the step length L, the size of the cavity height of the main roll $B_d$ and the mandrel $B_i$, the height of the smaller mandrel working surface $B_{il}$ and length of the mandrel step surface $L_i$ can be designed by $$B_d = B + 0 - 0.2 \text{ mm}, B_i = B_d + 0.1 - 0.5 \text{ mm}, B_{il} = B_s, L_i = L$$

The minimum width of the rolling cavity when the main roll and the mandrel are closed should be not more than the thickness of the ring. It can be designed as $$S_d + S_i = \frac{D - d_b}{2} - 0.25\text{-}1 \text{ mm}, S_d = (1\text{~}2)S_i$$

where $S_d$ is the width of the main roll cavity, $S_i$ is the upper width of the mandrel cavity.

The upper and lower surfaces of the main roll and mandrel cavities all have demolding angles. The demolding angle of the main roll cavity $\alpha_d$ and the mandrel cavity $\alpha_i$ both can be selected in the range 3°-7°.

b) Radial size of the roller working surface.

The linear velocity of the main roll is generally in the range 1.1-1.6 m/s. Then the radius of the main roll working surface can be designed by $R_d = 500 V_d/\pi n_d$,
where $n_d$ is the rotational speed of the main roll, it can be calculated by $n_d = n/\eta$, n is the rotational speed of the motor, $\eta$ is the transmission ratio, n and $\eta$ can be obtained according to the equipment parameter.

The minimum radius of the mandrel working surface should satisfy the following expression:

$$R_i \geq \frac{35\beta R_d - (D_0 - d_{s0})}{R_d(D_0 - d_{s0})}$$

where $R_i$ is the minimum radius of the mandrel working surface, β is the frictional angle, it can be calculated by β=arctan μ, μ is the friction coefficient, it is usually selected in 0.15-0.2.

In addition, $R_i$ should satisfy the following expression $$R_i + L_i + S_i = \frac{d_{s0}}{2} - 3 \sim 5 \text{ mm}$$

The center distance of the main roll and mandrel should be designed in the range of the limited center distance of the ring rolling mill $$R_d + S_d + R_i + L_i + S_i = \frac{L_{max} + L_{min}}{2}$$

where $L_{max}$ and $L_{min}$ are respectively the maximum and minimum allowed center distance of ring rolling mill.

According to the above conditions, the radial size of the working surface of the main roll and mandrel can be determined.

(3) Cold ring rolling process.

The main roll and mandrel should be manufactured as the above designed cavity size. Then they should be exactly installed on the ring rolling mill. After putting the ring blank manufactured as the above designed size on the rolling mill, the cold ring rolling process can be started. During the cold ring rolling process, the rolling speed should be controlled as three stages: high feed speed, middle feed speed and low feed speed. The feed speed and feed amount in each stage should be designed as follows:

Feed speed: the high feed speed $v_1=(2.5\sim5)v_{min}$, the middle feed speed $v_2=(1\sim2)v_{min}$, and the low feed speed $v_3=(0.5\sim0.8)v_{min}$.

Feed amount: the feed amount with high feed speed $\Delta h_1=0.6\Delta h$, the feed amount with middle feed speed $\Delta h_2=0.3\Delta h$, and the feed amount with low feed speed $\Delta h_3=0.1\Delta h$, where $v_{min}$ is the allowed minimum feed speed to make the ring producing plastic deformation, Δh is the total feed amount, $$v_{min} = \frac{0.003275 n_d R_d (D_0 - d_{s0})^2}{D_0} \left( \frac{1}{R_d} + \frac{1}{R_i} + \frac{2}{D_0} - \frac{2}{d_{s0}} \right),$$

$$\Delta h = \frac{D_0 - d_{s0}}{2} - \frac{D - d_s}{2}.$$

Chinese patent No. CN104694730A discloses a temperature and stress coupling loaded bearing body aging method and corresponding device (as presented in FIG. 1-4). It includes the following steps:

(1) Prepare the temperature and stress coupling loaded bearing body aging device. It includes the stress loading device and heating furnace with controlled temperature (10); the stress loading device includes: the upper cover (1) and locking bolt (2), arc-shaped pressing block (3), slider (4), shell (5), large bevel gear (6) and chuck base (7) and small bevel gears (8); about directions of the upper cover (1) are provided with slide holes. The number of arc-shaped pressing blocks (3) and locking bolts (2) is four. The four arc-shaped pressing blocks (3) are uniformly located under the upper cover (1). The lower end of the locking bolt (2) passes through the sliding hole of the upper cover (1) and is connected with the arc pressing block (3); the shell (5) is provided with four T chutes distributed along the shell radial. Slide block (4) is placed in the T chute under the arc-shaped pressing blocks (3). The arc pressing block (3) is connected with the sliding block (4) by bolts; the front side of the big bevel gear (5) is provided with an end face screw thread which is matched with the bottom surface of the sliding block (4). The bottom surface of the big bevel gear (5) is provided with mesh which is matched with small bevel gears (8). The small bevel gears (8) go through the shell side of the shell from the hole. The shell (5) is connected with the chuck base (7) through a bolt. The big bevel gear (6) is held up by the convex ring on the chuck base (7).

(2) Remove the locking bolt (2) and the upper cover (1); rotate the small bevel gears (8) to make the arc-shaped pressing block (3) to the inside fold. Lay the Conventional heat treated bearing body (9) flatly on the shell (5) on the outside of the arc-shaped pressing blocks (3). Rotate the small bevel gears (8) to make the arc-shaped pressing block (3) to the inside fold until the arc-shaped pressing blocks (3) cling to the bearing body (9). Limiting radial movement of the bearing base (9) is limited by the arc-shaped is pressed by radial force. Then fix the upper cover (1) to the top of the arc pressing block (3) by a locking bolt (2).

(3) Put the stress loading device together with the loaded bearing body (9) in the heating furnace with controlled temperature (10). The back of the chuck base (7) is attached to hearth bottom of the heating furnace (10).

A temperature and stress coupling loaded bearing body aging device (as presented in FIG. 1-4), It includes the stress loading device and heating furnace with controlled temperature (10); the stress loading device includes: the upper cover (1) and locking bolt (2), arc-shaped pressing block (3), slider (4), shell (5), large bevel gear (6) and chuck base (7) and small bevel gears (8); about directions of the upper cover (1) are provided with slide holes. The number of arc-shaped pressing blocks (3) and locking bolts (2) is four. The four arc-shaped pressing blocks (3) are uniformly located under the upper cover (1). The lower end of the locking bolt (2) passes through the sliding hole of the upper cover (1) and is connected with the arc pressing block (3); the shell (5) is provided with four T chutes distributed along the shell radial. Slide block (4) is placed in the T chute under the arc-shaped pressing blocks (3). The arc pressing block (3) is connected with the sliding block (4) by bolts; the front side of the big bevel gear (5) is provided with an end face screw thread which is matched with the bottom surface of the sliding block (4). The bottom surface of the big bevel gear (5) is provided with mesh which is matched with small bevel gears (8). The small bevel gears (8) go through the shell side of the shell from the hole. The shell (5) is connected with the chuck base (7) through a bolt. The big bevel gear (6) is held up by the convex ring on the chuck base (7). Put the stress loading device together with the loaded bearing body (9) in the heating furnace with controlled temperature (10). The back of the chuck base (7) is attached to hearth bottom of the heating furnace (10).

Chinese patent application No. CN201410145023.1 discloses a magnetic treatment method for controlling residual stress of bearing body after machining. It includes the following steps:

(1) Magnetic treatment on heat treated bearing body.

To apply magnetic treatment on heat treated bearing body, low frequency alternating magnetic field is generated by energizing the magnetizer composed of field coil windings and iron core in magnetic treatment device with AC excitation current produced by variable-frequency power source. The magnetic treatment process parameters are determined based on the following methods:

1) the applied magnetic induction intensity should be able to make the materials of the bearing components close to or reach the saturation magnetization state. The magnetic saturation intensity of the magnetic field is determined by measuring the magnetic hysteresis loop. For commonly materials used as bearing components, the saturation magnetization ranges from 1.2-2.5 T;

2) magnetic field frequency ranges from 1.5-4 Hz;

3) magnetic treatment lasts for 90-120 s;

Bearing body or bearing rolling body is fixed on fixture and then magnetic treated using the magnetic treatment process parameters mentioned above;

(2) Magnetic treatment on bearing body after grinding

To apply magnetic treatment on bearing body after grinding, low frequency alternating magnetic field is generated by energizing the magnetizer composed of field coil windings and iron core in magnetic treatment device with AC excitation current produced by variable-frequency power source. The magnetic treatment process parameters is determined based on the following methods:

1) the applied magnetic induction intensity should be able to make the materials of the bearing components close to or reach the saturation magnetization state. The magnetic saturation intensity of the magnetic field is determined by measuring the magnetic hysteresis loop. For commonly materials used as bearing components, the saturation magnetization ranges from 1.2-2.5 T;

2) magnetic field frequency ranges from 1.5-4 Hz;

3) magnetic treatment lasts for 90-120 s;

Bearing body or bearing rolling body is fixed on fixture and then magnetic treated using the magnetic treatment process parameters mentioned above;

The benefits for this invention: Microstructural stabilization of bearing body: firstly, controlled cold ring rolling enhances the dislocation density in the bearing body microstructure by cold plastic deformation and promotes the diffusion of carbon in austenite during quenching process. Therefore, the carbon content of retained austenite increases, the morphology and distribution of retained austenite is optimized and the thermal stability and mechanical stability of retained austenite is improved; then the quenching distortion deceases due to two liquid quenching. Lower temperature cooling provided by the second quenching medium, such as liquid nitrogen, can avoid the room temperature stable behavior of retained austenite and promote the martensitic transformation at the same time; thirdly, ultrasonic assisted multiple cryo-tempering treatment can effectively promote the transformation of retained austenite to martensite and gradually improve the stability of remaining retained austenite. A substantial increment in the number of transition carbides improves the wear resistance of bearing as well; finally, stress aging treatment promotes the decomposition of tempering martensite and promotes the preferential precipitation of carbide.

Internal stress relaxation of bearing body: for the bearing body internal stress reduction treatment, micro plastic deformation take place between the dispersed carbides and the surrounding microstructure matrix, leading to overall internal stress reduction.

By co-processing of microstructure stabilization and internal stress reduction, the stability of microstructure of bearing body should be enhanced, internal stress level be reduced and ultimately the precision stability of bearing be improved.

BRIEF DESCRIPTION OF THE DRAWINGS

In FIG. 1: 1—the upper cover; 2—the locking bolt; 3—the arc-shaped pressing block; 4—the slider; 5—the shell; 6—the large bevel gear; 7—the chuck base; 8—the small bevel gears; 9—the bearing body; 10—temperature control box.

DETAILED DESCRIPTION OF THE INVENTION

Figure 1:
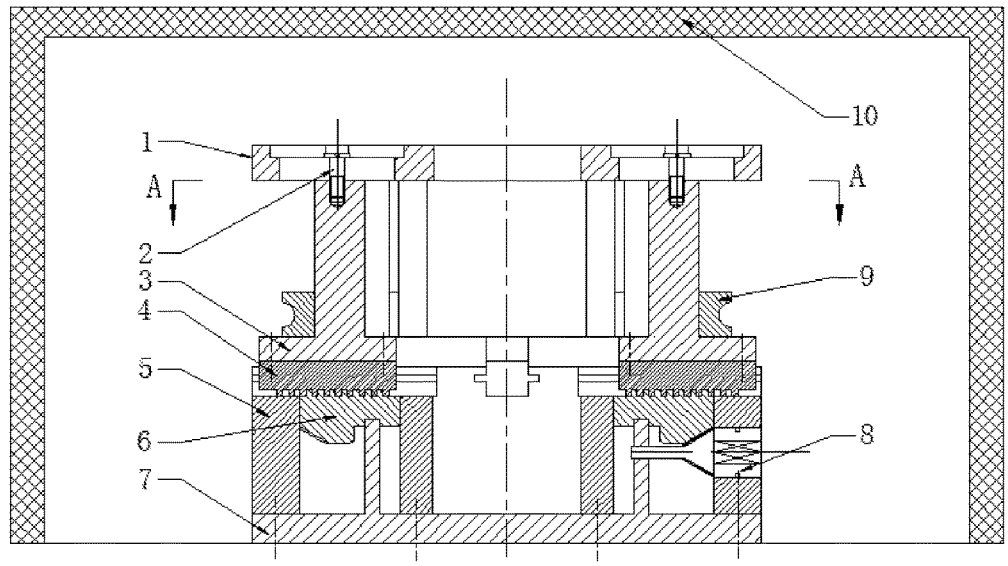
FIG. 1 is a structure diagram of the temperature and stress coupling loaded bearing body aging device disclosed in Chinese patent No. CN104694730A.
Figure 2:
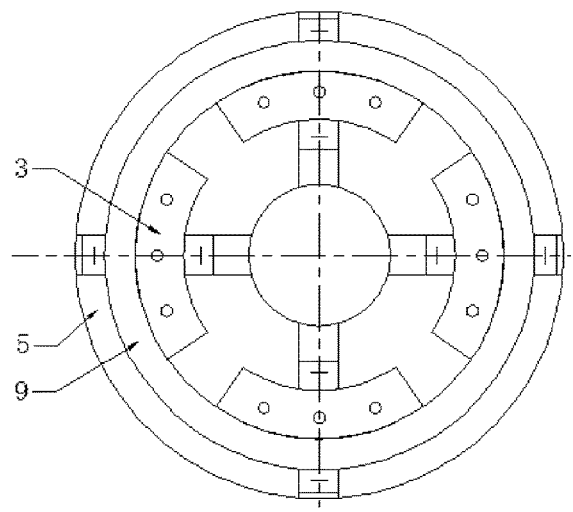
FIG. 2 is a section view of the bearing body aging device from an A-A direction shown in FIG. 1.
Figure 3:
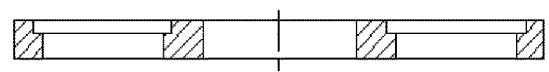
FIG. 3 is a structure diagram of the upper shield of the temperature and stress coupling loaded bearing body aging device.
Figure 4:
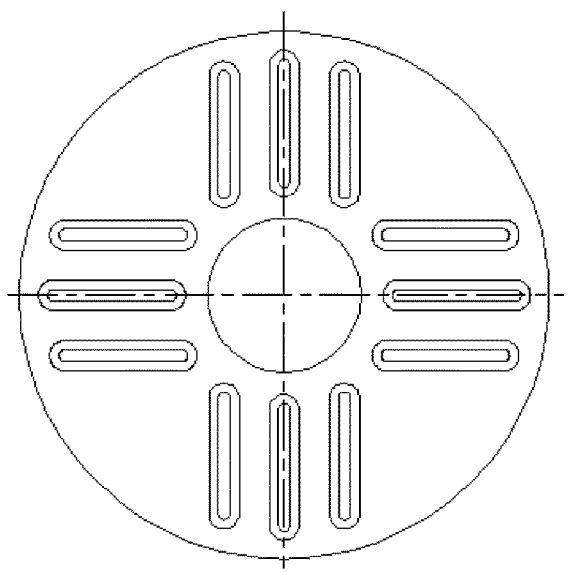
FIG. 4 is a vertical view of FIG. 3.

The following preferred embodiments of the present invention should not limit the scope of the invention. Any changes or modifications within numeric ranges of the present invention should be considered to be geared to this patent. Microstructural stabilization and internal stress reduction executed to some types of precision machine tool bearings according to aforementioned methods of invention.

Embodiment 1

A manufacturing method of precision machine tool bearing with high precision stability, including the following procedures:

(1) Microstructural stabilization of bearing body.

1) cold ring rolling with technical control: The forming method of cold ring rolling should be adopted. (It is an existing technology, for example, Chinese patent No. CN103316926A discloses a cold rolling forming method for automotive hub bearing ring part with L-shaped cross section). The bearing ring can be manufactured by cold ring rolling when the average feed amount is 37% and the average feed speed is 0.8 mm/s. (The material of the bearing ring is GCr15 steel)

2) two liquid quenching (quenching oil-liquid nitrogen quenching): The bearing body is heated up to 820° C. in a protective atmosphere (such as nitrogen) and held for 30 min. The quenched bearing body is obtained by oil quenched at 60° C. for 3 min, and then immersed in liquid nitrogen freezer at −190° C. for 4 min;

3) ultrasonic assisted multiple cryo-tempering treatment: A further cryogenic treatment is executed to the quenched bearing body in aforementioned liquid nitrogen freezer at −190° C. for 4 hours. During the low temperature holding, the liquid nitrogen is vibrated by ultrasonic with power of 350 W under vortex flow pressure of 3.0 MPa for 40 min. After cryogenic treatment, a low-temperature tempering is implemented to bearing body at 170° C. for 1 hours. Circulate the above cold treatment and low temperature tempering for 2 times;

4) stress ageing treatment: After ultrasonic assisted multiple cryo-tempering treatment, stress ageing treatment is applied using a temperature and stress coupling loaded bearing body aging device (For instance, Chinese patent No. CN104694730A discloses a temperature and stress coupling loaded bearing body aging method and corresponding device) with loading force ranged from 90 N and aging temperature ranged from 100° C. for 5 hours.

(2) Precision machining: Precision machining is executed to the microstructural stabilized bearing body.

(3) Internal stress relaxation of bearing body: The precision machined bearing body is magnetic treated according to a magnetic treatment method for controlling residual stress of bearing body after machining stated in Chinese patent No. CN201410145023.1. To obtain bearing body with high microstructure stability and low internal stresses, the saturation magnetization is 2.0 T, the magnetic field frequency is 3 Hz and the residence time is 120 s.

(4) Bearing assembly: By assembling the bearing body fulfilled the above methods with other bearing components, finally precision machine tool bearing with high precision stability can be obtained.

Comparison of microstructure and internal stress tests is made between the bearing body manufactured according to this method and conventional ways. The morphology of retained austenite is film-like rather than block and its amount decreased by 36%. The thermal stability and mechanical stability of retained austenite increased by 14% and 60%, respectively. The average internal stresses decreased by 20%. Comparative results demonstrate that by using the manufacturing method in this patent, the microstructure stability of bearing body is enhanced, internal stress level is reduced and ultimately the precision stability of bearing is improved.

Embodiment 2

A manufacturing method of precision machine tool bearing with high precision stability, including the following procedures:

(1) Microstructural stabilization of bearing body.

1) cold ring rolling with technical control: The forming method of cold ring rolling should be adopted. (It is an existing technology, for example, Chinese patent No. CN103316926A discloses a cold rolling forming method for automotive hub bearing ring part with L-shaped cross section). The bearing ring can be manufactured by cold ring rolling when the average feed amount is 30% and the average feed speed is 0.5 mm/s. (The material of the bearing ring is GCr15SiMn steel);

2) two liquid quenching (quenching oil-liquid nitrogen quenching): The bearing body is heated up to 840° C. in a protective atmosphere (such as nitrogen) and held for 30 min. The quenched bearing body is obtained by oil quenched at 60° C. for 4 min, and then immersed in liquid nitrogen freezer at −190° C. for 5 min;

3) ultrasonic assisted multiple cryo-tempering treatment: A further cryogenic treatment is executed to the quenched bearing body in aforementioned liquid nitrogen freezer at −120° C. for 3 hours. During the low temperature holding, the liquid nitrogen is vibrated by ultrasonic with power of 300 W under vortex flow pressure of 2.5 MPa for 20 min. After cryogenic treatment, a low-temperature tempering is implemented to bearing body at 160° C. for 1 hours. Circulate the above cold treatment and low temperature tempering for 2 times;

4) stress ageing treatment: After ultrasonic assisted multiple cryo-tempering treatment, stress ageing treatment is applied using a temperature and stress coupling loaded bearing body aging device (For instance, Chinese patent No. CN104694730A discloses a temperature and stress coupling loaded bearing body aging method and corresponding device) with loading force ranged from 70N and aging temperature ranged from 120° C. for 3 hours.

(2) Precision machining: Precision machining is executed to the microstructural stabilized bearing body.

(3) Internal stress relaxation of bearing body: The precision machined bearing body is magnetic treated according to a magnetic treatment method for controlling residual stress of bearing body after machining stated in Chinese patent application No. CN201410145023.1. To obtain bearing body with high microstructure stability and low internal stresses, the saturation magnetization is 1.2 T, the magnetic field frequency is 1.5 Hz and the residence time is 90 s.

(4) Bearing assembly: By assembly the bearing body fulfilled the above methods with other bearing components, finally precision machine tool bearing with high precision stability can be obtained.

Comparison of microstructure and internal stress tests is made between the bearing body manufactured according to this method and conventional ways. The morphology of retained austenite is film-like rather than block and its amount decreased by 56%. The thermal stability and mechanical stability of retained austenite increased by 10-15% and 64%, respectively. The average internal stresses decreased by 40%. Comparative results demonstrate that by using the manufacturing method in this patent, the stability of microstructure of bearing body is enhanced, internal stress level is reduced and ultimately the precision stability of bearing is improved.

Embodiment 3

A manufacturing method of precision machine tool bearing with high precision stability, including the following procedures:

(1) Microstructural stabilization of bearing body.

1) cold ring rolling with technical control: The forming method of cold ring rolling should be adopted. (It is an existing technology, for example, Chinese patent No. CN103316926A discloses a cold rolling forming method for automotive hub bearing ring part with L-shaped cross section). The bearing ring can be manufactured by cold ring rolling when the average feed amount is 35% and the average feed speed is 1 mm/s. (The material of the bearing ring is GCr15SiMn steel);

2) two liquid quenching (quenching oil-liquid nitrogen quenching): The bearing body is heated up to 840° C. in a protective atmosphere (such as 80 vol. % nitrogen+80 vol. % argon) and held for 60 min. The quenched bearing body is obtained by oil quenched at 70° C. for 5 min, and then immersed in liquid nitrogen freezer at −190° C. for 10 min;

3) ultrasonic assisted multiple cryo-tempering treatment: Cryogenic treatment is executed to the quenched bearing body in aforementioned liquid nitrogen freezer at −190° C. for 5 hours. During the low temperature holding, the liquid nitrogen is vibrated by ultrasonic with power of 370 W under vortex flow pressure of 3.5 MPa for 40 min. After cryogenic treatment, a low-temperature tempering is implemented to bearing body at 180° C. for 2 hours. Circulate the above cryogenic treatment and low temperature tempering for 3 times;

4) stress ageing treatment: After ultrasonic assisted multiple cryo-tempering treatment, stress ageing treatment is applied using a temperature and stress coupling loaded bearing body aging device (For instance, Chinese patent No. CN104694730A discloses a temperature and stress coupling loaded bearing body aging method and corresponding device) with loading force ranged from 150 N and aging temperature ranged from 150° C. for 6 hours.

(2) Precision machining: Precision machining is executed to the microstructural stabilized bearing body.

(3) Internal stress relaxation of bearing body: The precision machined bearing body is magnetic treated according to a magnetic treatment method for controlling residual stress of bearing body after machining stated in Chinese patent No. CN201410145023.1. To obtain bearing body with high microstructure stability and low internal stresses, the saturation magnetization is 2.5 T, the magnetic field frequency is 4 Hz and the residence time is 120 s.

(4) Bearing assembly: By assembling the bearing body fulfilled the above methods with other bearing components, finally precision machine tool bearing with high precision stability can be obtained.

Comparison of microstructure and internal stress tests is made between the bearing body manufactured according to this method and conventional ways. The morphology of retained austenite is film-like rather than block and its amount decreased by 47%. The thermal stability and mechanical stability of retained austenite increased by 15% and 56%, respectively. The average internal stresses decreased by 37%. Comparative results demonstrate that by using the manufacturing method in this patent, the stability of microstructure of bearing body is enhanced, internal stress level is reduced and ultimately the precision stability of bearing is improved.

Implementing the manufacturing method by choosing the technological parameters (such the loading stress, temperature, time, magnetic saturation intensity, magnetic field frequency and so on) within the upper and lower bounds is similar to the above examples and the beneficial effects is also similar. So examples are not given one by one in this description.

What is claimed is:

1. A manufacturing method of precision machine tool bearing with high precision stability, comprising the following procedures:
   (A) microstructural stabilization of bearing body, comprising:
       (i) cold ring rolling: wherein a bearing body ring is formed by cold ring rolling under an average feed amount ranged from 20%-40% and an average feed speed ranged from 0.5 mm/s-1 mm/s;
       (ii) two liquid quenching: wherein the bearing body ring is heated up to 820° C.-840° C. in a protective atmosphere and held for 30-60 min, wherein a quenched bearing body is obtained by oil quenched at 60-70° C. for 3-5 min, and then immersed in liquid nitrogen freezer at −190° C. for 4-10 min;
       (iii) ultrasonic assisted multiple cryo-tempering treatment: cryogenic treatment is executed to the quenched bearing body in aforementioned liquid nitrogen freezer at −120° C. to −196° C. for 3-5 hours, wherein during the low temperature holding, the liquid nitrogen is vibrated by ultrasonic under the vortex flow pressure of 2.5-3.5 MPa for 20-40 min, wherein after cryogenic treatment, a low-temperature tempering is implemented to bearing body at 160° C.-180° C. for 1-2 hours, wherein circulate the above cryogenic treatment and low temperature tempering for 2-3 times; and
       (iv) stress ageing treatment: wherein after ultrasonic assisted multiple cryo-tempering treatment, stress ageing treatment is applied using a temperature and stress coupling loaded bearing body aging device with loading force ranged from 60-150N and aging temperature ranged from 80-150° C. for 3-6 hours;
   (B) precision machining: wherein the precision machining is executed to the microstructural stabilized bearing body;
   (C) internal stress relaxation of bearing body: wherein the precision machined bearing body is magnetic treated in magnetic field with saturation magnetization ranged from 1.2-2.5 T and magnetic field frequency ranged from 1.5-4 Hz for 60-180 s to obtain bearing body with high microstructure stability and low internal stresses; and
   (D) bearing assembly: by assembling the bearing body fulfilled the above methods with other bearing components, finally precision machine tool bearing with high precision stability can be obtained.

2. The manufacturing method of precision machine tool bearing with high precision stability according to claim 1, wherein the protective atmosphere in step (ii) is nitrogen or argon, or the mixture of nitrogen and argon.

3. The manufacturing method of precision machine tool bearing with high precision stability according to claim 1, wherein the power of the ultrasonic wave in step (iii) is 300 to 500 W.

* * * * *